United States Patent
Reyinger et al.

(10) Patent No.: US 8,535,520 B2
(45) Date of Patent: Sep. 17, 2013

(54) THREE-STAGE FUEL FILTER

(75) Inventors: Jochen Reyinger, Waiblingen (DE);
Martin Weindorf, Kornwestheim (DE);
Sven Brall, Saarbruecken (DE)

(73) Assignee: Mann + Hummel GmbH, Ludwigsburg (DE)

(*) Notice: Subject to any disclaimer, the term of this patent is extended or adjusted under 35 U.S.C. 154(b) by 539 days.

(21) Appl. No.: 12/816,294

(22) Filed: Jun. 15, 2010

(65) Prior Publication Data

US 2010/0314303 A1 Dec. 16, 2010

(30) Foreign Application Priority Data

Jun. 16, 2009 (DE) .................. 10 2009 025 393

(51) Int. Cl.
*B01D 35/147* (2006.01)
*B01D 29/58* (2006.01)
*F02M 37/22* (2006.01)

(52) U.S. Cl.
USPC .......... 210/130; 210/132; 210/314; 210/345; 210/441; 210/DIG. 5

(58) Field of Classification Search
USPC ............. 210/130, 132, 335, 314, 437, 438, 210/441, 442, 345, 347, DIG. 5
See application file for complete search history.

(56) References Cited

U.S. PATENT DOCUMENTS

| | | | | |
|---|---|---|---|---|
| 2,098,725 A | * | 11/1937 | Hurn | 210/132 |
| 7,938,963 B2 | * | 5/2011 | Klein et al. | 210/295 |
| 2008/0308474 A1 | * | 12/2008 | Girondi | 210/132 |

FOREIGN PATENT DOCUMENTS

| | | | |
|---|---|---|---|
| DE | 10150273 A1 | * | 4/2003 |
| DE | 102006034874 | | 1/2008 |
| EP | 0405447 | | 1/1991 |

OTHER PUBLICATIONS

German Patent Office, Office Action on foreign priority application: DE 10 2009 025 393.9, Jun. 2010.

* cited by examiner

*Primary Examiner* — Terry Cecil
(74) *Attorney, Agent, or Firm* — James Hasselbeck

(57) ABSTRACT

A fuel filter has a coalescent element for separating water from fuel, a prefilter element, a main filter element, and a common central tube, wherein the coalescent element, the prefilter element, and the main filter element are arranged sequentially along the common central tube. A fuel filter arrangement has a housing in which the fuel filter is arranged. The common central tube of the fuel filter is attached to the housing, wherein between the fuel filter and the housing an annular space is formed.

20 Claims, 3 Drawing Sheets

THREE-STAGE FUEL FILTER

CROSS REFERENCE TO RELATED APPLICATIONS

This application claims the benefit under 35 USC 119 of foreign application 10 2009 025 393.9 filed in Germany on Jun. 16, 2009, and which is hereby incorporated by reference in its entirety.

TECHNICAL FIELD

The invention relates to a fuel filter comprising a coalescent element for separating water from the fuel as well as a prefilter element arranged downstream or upstream of the coalescent element. The invention also concerns a fuel filter arrangement with such a fuel filter.

BACKGROUND OF THE INVENTION

DE 10 2006 034 874 A1 discloses a fuel filter, in particular a particle filter for diesel fuel, in which a particle filter and a coalescent element arranged upstream thereof are arranged in a common housing. The coalescent element serves for improved separation of water droplets from the fuel. As a seal between the incoming fuel and the outflowing fuel the coalescent element has a sealing disk that extends about the coalescent element in radial direction up to the wall of the housing. For sealing at the housing, an elastomer lip can be provided that is injection-molded to the outer area of the terminal disk and rests seal-tightly against the housing.

In order to fulfill the increasing demands on the efficiency of the separation or purification of the fuel, in many applications it is necessary to supply the fuel to a further so-called main filter element that provides an additional separation of finest particles from the fuel. Such a main filter element is typically a separate assembly arranged in an additional housing so that the required space and cost expenses for filtration are increased.

SUMMARY OF THE INVENTION

It is therefore an object of the present invention to prevent the aforementioned disadvantages and to provide a fuel filter and filter arrangement with a fuel filter in which over the entire service life of the fuel filter a highly efficient separation is ensured and the fuel filter as well as the fuel filter arrangement can be produced in a simple way.

In accordance with the present invention, this is achieved for a fuel filter of the aforementioned kind in that the coalescent element, the prefilter element as well as the main filter element, usually downstream of the prefilter element, are arranged along a common central tube. Such an arrangement of the three elements sequentially behind another is particularly beneficial when there is only little space available for installation so that it is not possible to install two separate assemblies next to one another. The three-stage fuel filter can be mounted in particular in a single housing wherein the central tube through which the supply and discharge of fuel is realized is connected to the housing. In addition to transport through the central tube, the transport of fuel in this case can also be realized through an annular space that is formed between the fuel filter and the housing.

In one embodiment, the filter medium used in the prefilter is, for example, in the form of a two-layer medium with a coarse filtration layer, for example, of cellulose, and a hydrophobic blocking layer. For the main filter element a two-layer filter medium may be used, for example, comprising a cellulose layer for fine filtration and a layer of melt-blown fibers. Alternatively, a single layer medium, in particular, a medium with a structure that changes in the direction of flow can be used.

In one embodiment, between the coalescent element and the main filter element or between the prefilter element and the main filter element a separation device is provided that extends from the central tube in radial direction for providing a sealing action relative to a housing or a housing wall. By means of the separation device the annular space between the housing wall and the fuel filter can be divided into two annular sections, for example, for separating the clean (filtered) side of the three-stage filter element from the raw (unfiltered) side or from the space downstream of the coalescent element so that unfiltered fuel or separated water cannot pass to the clean side. The separating device can be, for example, supported by means of a profiled seal on the central tube. In particular, a terminal disk of the coalescent element or of the prefilter element or of the main filter element can also serve as a part of the separating device. The gap that remains between the terminal disk and the housing can then be sealed by means of a seal, for example, the shaped seal that is injection-molded onto the terminal disk. It is understood that optionally also a separate separating disk (optionally provided with a sealing element for sealing the gap) that extends from the central tube in radial direction can be mounted between the coalescent element or the prefilter element and the main filter element.

In a further embodiment the separating device has a valve for releasing the connection to the main filter element upon clogging of the prefilter element. When the prefilter element is clogged, the pressure within the (lower) annular section in which the prefilter element and the coalescent element are arranged will increase. The valve opens when the pressure differential between the two annular sections separated by the separating element surpasses a certain predefined value. The valve separates either the raw side of the prefilter element from the raw side of the main filter element or, particularly advantageously, the raw side of the coalescent element from the raw side of the main filter element. In this way, even when the prefilter is clogged, fuel can still reach the main filter element so that the engine continues to be supplied with fuel and a breakdown of the motor vehicle can thus be prevented. The main filter element is typically flowed through from the exterior to the interior so that the fuel that has passed through the valve passes through the main filter element to the clean side.

According to one embodiment the valve is embodied as an elastic seal, in particular, as a sealing lip for sealing the fuel filter relative to a housing. The sealing lip in this connection can be produced of plastic material, for example, an elastomer, wherein the shape of the sealing lip and the elastic properties of the material are matched relative to one another in such a way that the sealing lip at a preadjusted pressure is elastically deformed from a first configuration, in which the sealing lip seals the fuel filter relative to the housing wall, to such an extent that the sealing lip is lifted off the housing wall and the fuel is transported from the lower annular section to the main filter element in the upper annular section.

In one embodiment the coalescent element is arranged between the main filter element and the prefilter element. The main filter element is typically arranged above and the prefilter element below the coalescent element, and the separating device separates the lower annular section containing the coalescent element and the prefilter element from the upper annular section. At the lower end of the lower annular section typically a water collecting chamber is provided in which the water that has been separated by the coalescent element and the prefilter element can be discharged. The prefilter element can be provided, particularly at the inlet side, with a water-repellant impregnation so that no water or only minimal quantities of water can penetrate into the prefilter element. In both cases, typically the coalescent element is flowed through radially from the interior to the exterior and the prefilter element from the exterior to the interior. Alternatively, with a different configuration of the central tube, reversed flow directions can be realized.

According to another embodiment, the central tube has at least three chambers extending in the axial direction; each chamber preferably has at least one opening that is provided at the periphery of the central tube. The three chambers serve in this connection for supplying the unfiltered fuel, removing the filtered fuel, as well as transporting the fuel that has been purified by the prefilter element and the coalescent element to the main filter element. The chambers may extend parallel to one another in different angular segments of the central tube. In particular, the central tube can be divided into three angular segments that correspond to the chambers and extend, for example, each about a 120 degree angle, or into four angular segments that each extends about a 90 degree angle. Each of the segments thus contains one of the chambers wherein the transport of the fuel between the individual chambers is realized by the openings provided on the periphery of the central tube.

In one embodiment, a first chamber has a first opening provided peripherally on the central tube for supplying unfiltered fuel to the coalescent element. The coalescent element in this case is flowed through from the interior to the exterior. The fuel can be supplied particularly from the bottom side of the fuel filter. The subsequent transport of the fuel from the coalescent element to the prefilter element can be realized through the annular space that is formed between the fuel filter and the housing.

In a further embodiment, in the first chamber at the upper end of the coalescent element a deflection surface for deflecting the fuel to the first opening is provided. The deflection or boundary surface closes off the first chamber at the upper end of the coalescent element so that the unfiltered fuel in the first chamber cannot rise more than required past the coalescent element. For producing the deflection surface the central tube can be embodied in particular of a two-part configuration (see below).

In a further embodiment the second chamber has a second opening provided peripherally on the central tube for removing filtered fuel from the prefilter element, wherein the second opening is preferably angularly displaced relative to the first opening. By means of this displaced arrangement of the openings relative to one another, the flow of fuel from the first chamber into the second chamber is enabled. In the second chamber the fuel that has been filtered in the prefilter element can be supplied to the main filter element in that the fuel in the second chamber will rise until at the upper end of the central tube it enters a space formed above the fuel filter element which space, at its radial outer edge, passes into the upper section of the annular space. Here, the fuel can enter the main filter that is flowed through from the exterior to the interior.

In a further embodiment, the third chamber has a third opening provided on the periphery of the central tube for removing filtered fuel from the main filter element wherein the third opening is arranged preferably with angular displacement relative to the first and second openings. By means of the third opening, the purified fuel can pass through the third chamber of the central tube to an exit opening that is provided at the bottom side of the fuel filter within the housing. It is understood that the third chamber at the upper end of the central tube is closed off in order to prevent passage of the fuel from the space above the fuel filter.

In a further embodiment the central tube has a fourth chamber extending in the axial direction and provided for the purpose of venting; it is furnished at the upper end face of the central tube with a venting opening. The air that possibly collects in the upper collecting chamber can therefore be removed through the fourth chamber from the fuel filter. Return flow is realized preferably to the fuel tank. Advantageously, the venting opening is sufficiently small in order to keep the quantity of fuel passing through as small as possible.

In a further embodiment the central tube is of a two-part configuration wherein both parts of the central tube are preferably connectable to one another in the area of the upper end of the coalescence element. In particular, the upper part of the central tube can be pushed onto the lower part of the central tube wherein both parts are connected seal-tightly with one another. The upper part of the central tube can be connected e.g. fixedly to the main filter element so that the main filter element together with the upper part of the central tube can be pushed onto the lower part of the central tube. This is in particular beneficial when the main filter element is configured as an exchangeable (disposable) part. Moreover, by providing the two-part configuration of the central tube the above described deflection surface can be embodied in a simple way at the lower end face of the upper part of the central tube; this reduces manufacturing expenditure.

The invention is also realized in the form of a fuel filter arrangement comprising a fuel filter as described above as well as a housing to which the central tube is attached wherein between the fuel filter and the housing an annular space is formed. The fuel filter is typically attached to the lower end of the central tube, for example, by being screwed onto the housing, wherein the first and the third chamber of the central tube are connected seal-tightly at the lower end to an inlet for unfiltered fuel and an outlet for filtered fuel provided within the housing.

In a further embodiment the separating device divides the annular space in the area between the coalescence element and the main filter element or between the prefilter element and the main filter element into an upper annular section and into a lower annular section. As described above, the separating device can fulfill a valve function and enable passage of fuel from the lower annular section into the upper annular section inasmuch as the prefilter elements during the service life of the fuel filter will become clogged.

In a further embodiment the housing is provided at the lower end of the lower annular section with a water collecting chamber. The water collecting chamber serves for collecting the water that has been separated at the coalescent element or the prefilter element. The water that is contained in the water collecting chamber can be, for example, removed through a water discharge valve as soon as the water quantity has surpassed a predetermined filling level.

Further features and advantages of the invention result from the following description of embodiments of the invention with the aid of the figures of the drawing, illustrating important details of the invention, and from the claims. The individual features can be used individually, or several in any combination, for realizing variants of the invention.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 1b is a bottom view of the embodiment of FIG. 1a;

FIG. 2a is a section view of the fuel filter along the section line IIa-IIa of FIG. 1a.

Figure 1A:
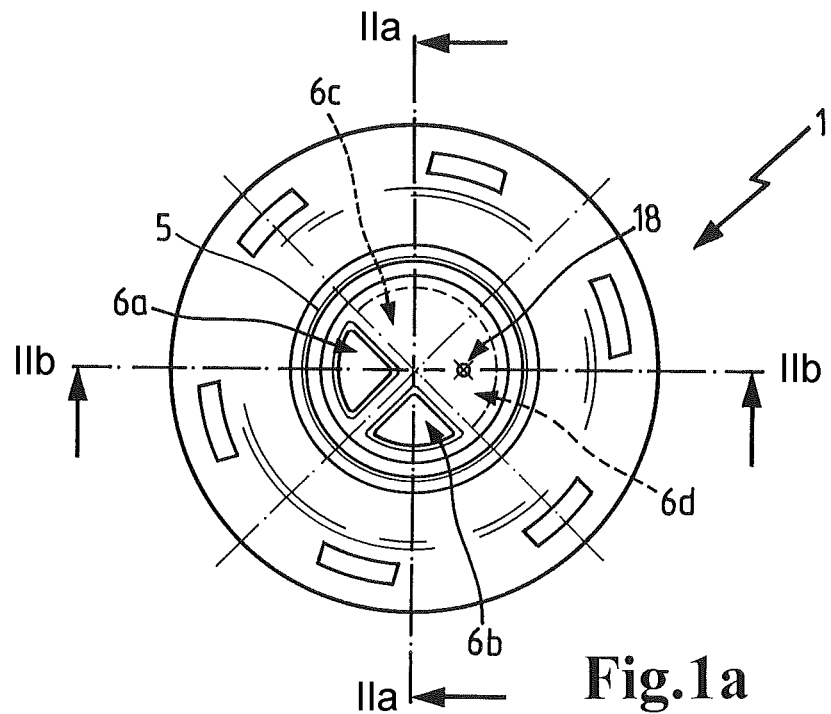
FIG. 1a shows a top view of one embodiment of the fuel filter according to the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to three-stage fuel filter. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1B:
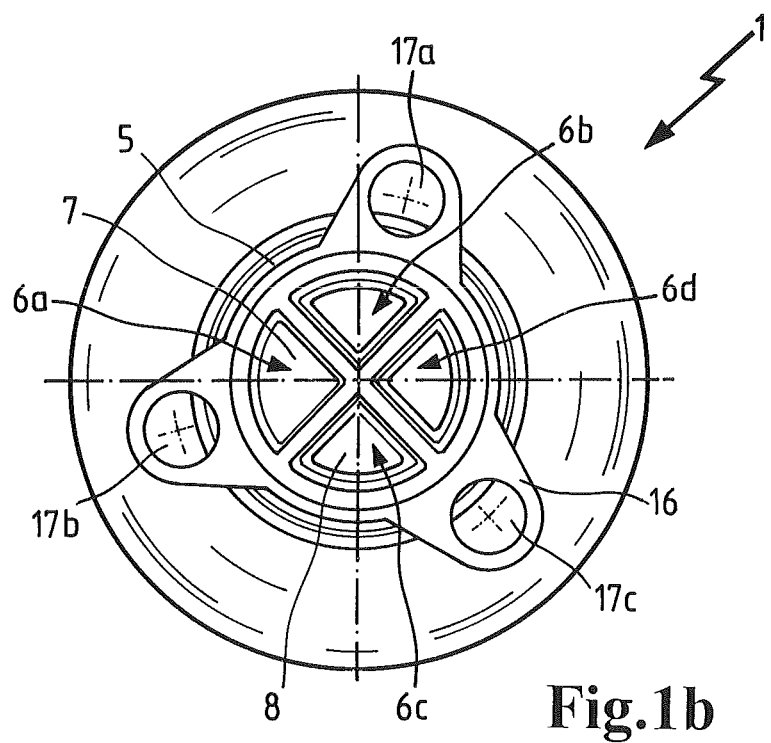
Figure 2A:
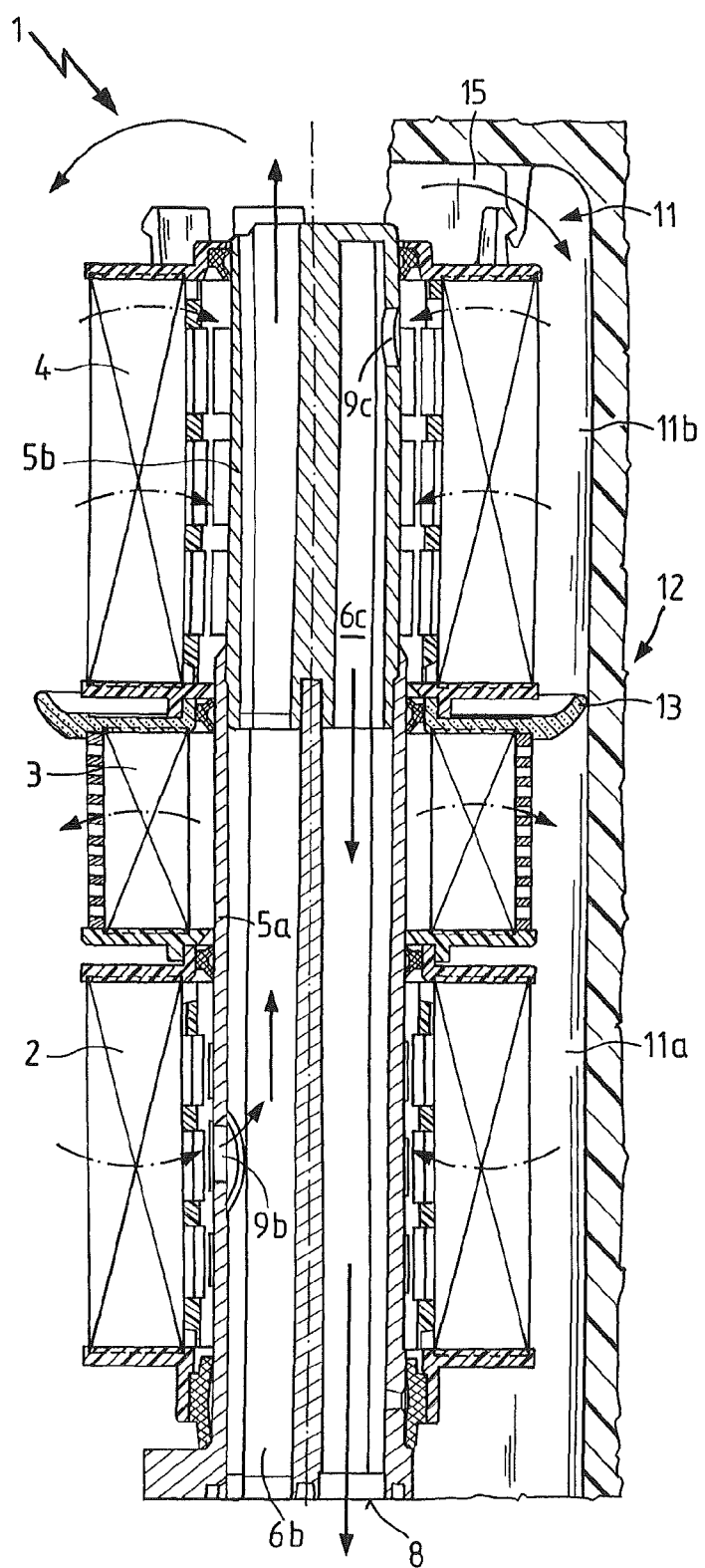
Figure 2B:
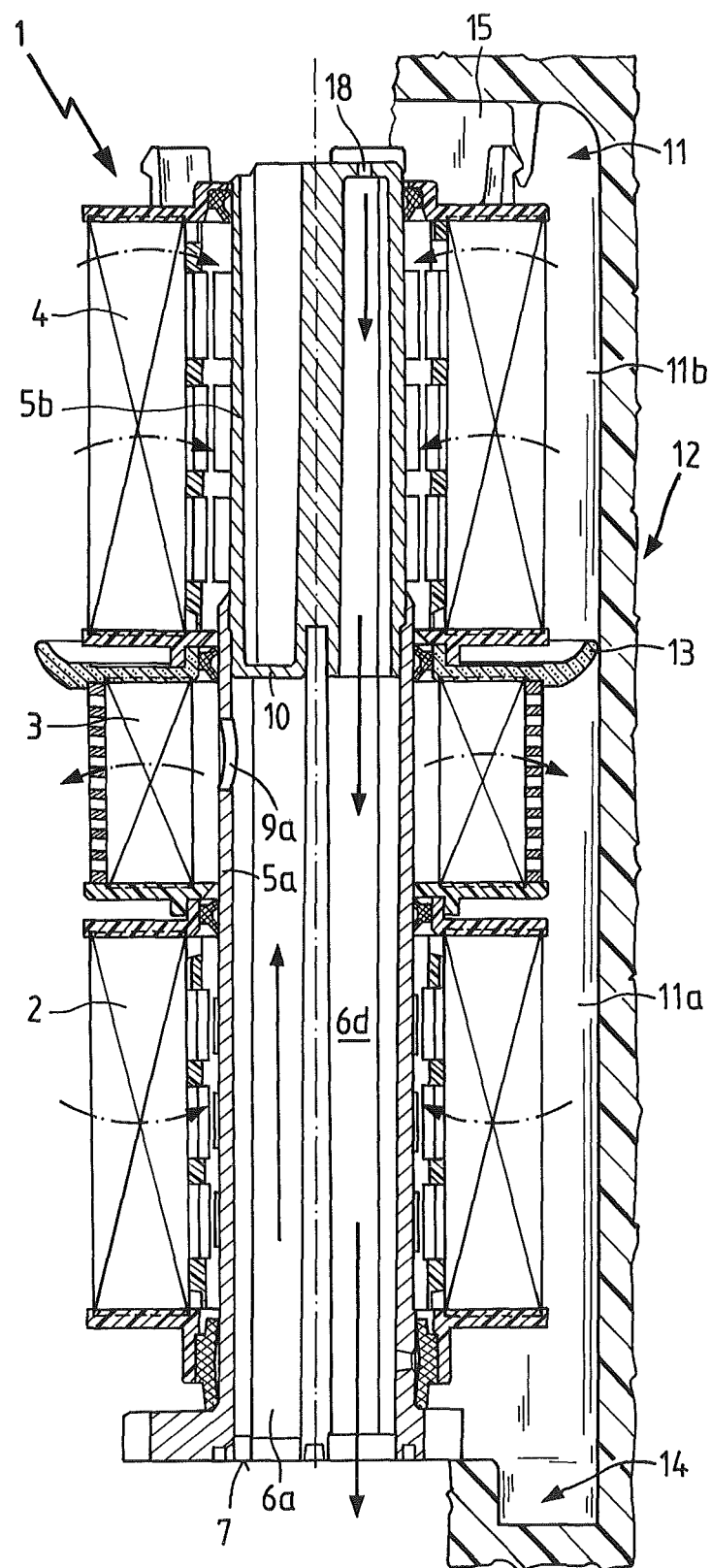
FIG. 2b is a section view of the fuel filter along the section line IIb-IIb.

FIGS. 1a, 1b show a three-stage fuel filter 1 in a top view and in a bottom view. The fuel filter 1 is illustrated in FIGS. 2a, 2b in a section illustration along the section lines IIa-IIa and IIb-IIb of FIG. 1a, respectively. As can be seen in FIGS. 2a, 2b, the fuel filter 1 has a prefilter element 2, a coalescent element 3 as well as a main filter element 4 that each have a (circular) cylindrical shape and are sequentially concentrically arranged along the common central tube 5a+5b. The combination 5a+5b is also referred to hereinafter as central tube 5.

The central tube 5 has a lower part 5a and an upper part 5b that at the upper end of the coalescent element 3 is pushed onto the lower part 5a so that the two parts 5a, 5b are seal-tightly connected to one another. Four chambers 6a-6d extend in axial direction through the central tube 5. The chambers 6a-6d each extend about an angular range of approximately 90 degrees so that the interior of the central tube 5 is divided into four sections of substantially same size.

In the following, the flow of fuel through the fuel filter 1 is illustrated with the aid of the FIGS. 2a, 2b; the arrows indicate the flow direction of the fuel, respectively. Thus, the fuel flows from the inlet opening 7 at the unfiltered side, shown in FIG. 1b, to the outlet opening 8 at the filtered side, also shown in FIG. 1b, at the lower end face of the central tube 5.

More specifically, the fuel that enters the fuel filter 1 through inlet opening 7 rises within the first chamber 6a and passes through a first opening 9a provided peripherally on the central tube 5 into the coalescent element 3 that is flowed through from the interior to the exterior. In order to prevent rising of the fuel past the area of the coalescent element 3, in the area of the upper end of the coalescent element 3 a deflection surface 10 is provided that delimits the first chamber 6a upwardly. The deflection surface 10 in this connection is mounted at the lower end face of the upper part 5b of the central tube 5.

The fuel flows through the coalescent element 3 in radial direction from the interior to the exterior. The coalescent element 3 can be comprised, for example, of a hydrophilic material and serves for coalescing, i.e., combining, small water droplets contained in the fuel to larger water droplets. The fuel passes at the exterior side of the coalescent element 3 into an annular space 11 that is formed between the fuel filter 1 and a housing 12 that is schematically shown in FIGS. 2a, 2b on the right side, respectively.

The annular space 11 is divided by a separating device 13 in the form of a sealing lip into a lower annular section 11a and an upper annular section 11b. It is understood that also the upper terminal disk of the coalescent element 3 is configured to be seal-tight and serves as a separating element so that no fuel can flow past the terminal disk or the seal 13 into the upper annular section 11b. The integrally injection-molded elastomer sealing lip provided on the upper terminal disk of the coalescent element 3, in addition to its function as a seal, serves also as a valve as will be explained in the following in more detail.

The fuel that enters the lower annular section 11a flows downwardly and enters the prefilter element 2 that is flowed through from the exterior to the interior. The water droplets contained in the fuel sink into the annular section 11a farther downwardly into the water collecting chamber 14 provided within the housing 12. The prefilter element 2 is provided at its exterior side with a hydrophobic coating in order to prevent penetration of the water droplets.

The fuel that has passed the prefilter element 2 passes through a second opening 9b that is positioned displaced by 90 degrees relative to the first opening 9a into a second chamber 6b of the fuel filter 1 in which the fuel rises to the upper end face of the central tube 5 where it enters an upper collecting chamber 15 that is formed between the housing 12 and the upper end of the fuel filter 1. In the chamber 15 the fuel flows in radial direction outwardly and passes into the upper annular section 11b. The fuel in the upper annular section 11b flows then through the main filter element 4 from the exterior to the interior and passes through a third opening 9c that is arranged relative to the second opening 9b displaced by angle of 180 degrees into a third chamber 6c of the central tube 5. In the third chamber 6c the filtered fuel flows downwardly and exits the fuel filter 1 through the outlet opening 8.

The fuel filter 1 is connected seal-tightly to the housing 12 with the lower end face of the central tube 5 wherein the connection is produced in particular by screwing. For this purpose, at the lower end of the central tube 5 (compare FIG. 1b) a fastening element 16 is provided that has three holes 17a-17c for engagement by screws or the like. The inlet opening 7 and the outlet opening 8 are adjoined by a supply line and a discharge line for fuel provided in the bottom of the housing 12.

Within the bottom of the housing 12 a further discharge line is provided which is connected to a fourth chamber 6d of the central tube 5 provided for venting and serves as a return line for emptying into the tank. At the upper end face of the fourth chamber 6d a venting opening 18 is provided through which air contained in the fuel can be removed from the upper collecting chamber 15.

The prefilter element 2 as well as the main filter element 4 are embodied as particle filters and can be comprised, for example, of zigzag-folded filter webs. It is understood that the filter elements 2, 4 can also the formed in other ways, for example, as block filters. Typically, the prefilter 2 serves for separating coarse particles while the main filter element 4 is used for separating fine particles.

When the prefilter element 2 clogs during the service life of the fuel filter 1, the pressure within the lower annular section 11a will increase. As soon as the pressure has surpassed a critical value, the outer end of the circumferentially extending elastomer seal 13 will lift off the wall of the housing 12 so that between the seal 13 and the housing 12 a gap is formed that enables passage of fuel from the lower annular section 11a into the upper annular section 11b. In this way it can be ensured that even for a clogged prefilter element 2 fuel can still be supplied to the main filter 4 and from there can reach the engine so that a breakdown of the motor vehicle in which the fuel filter 1 is typically arranged can be prevented. It is understood that at least for a short period of time a penetration of water droplets that have formed at the coalescent element 3 into the main filter element 4 can be prevented by a suitable impregnation so that even for a clogged prefilter element 2 the water contained in the fuel cannot penetrate into the main filter element 4 and cannot reach the clean side.

As has been explained above, the central tube 5 is comprised of a lower part 5a and an upper part 5b that in the area of the upper end of the coalescent element 3 are connected to one another. It is understood that for mounting of the filter element 1 in the housing 12, the main filter element 4 can be connected fixedly to the upper part 5b of the central tube 5 so that the main filter element 4 together with the upper part 5b of the central tube 5 can be pushed onto the lower part 5a of the central tube 5. When the upper terminal disk of the main filter element 4 has locking elements as illustrated in FIGS. 2a, 2b for locking on matching locking elements provided at the housing 12, it is possible, in particular when the housing 12 is comprised of an upper housing part and a lower housing part that are connected e.g. by screwing, to remove upon removal of the upper housing part the main filter element 4 at the same time.

It is understood that the prefilter element 2, the main filter element 4, and the coalescent element 3 must not be arranged mandatorily along the central tube 5 in accordance with the sequence illustrated in FIGS. 2a, 2b. In particular, the sequence of the prefilter element 2 and of the coalescent element 3 can be switched. In this case, the separating element 13 is arranged in the area of the upper end of the prefilter element 2. It is understood that the separating element 13, in deviation from what is shown in FIGS. 2a, 2b, can also be formed by the lower terminal disk of the main filter element 4 in combination with a radial seal that extends away from the terminal disk in radial direction up to the housing 12, or formed in another way. In this case, the radial seal of the separating element can also have a valve function either in that the entire radial seal in the area of the housing wall will fold upwardly or in that a partial area of the radial seal or a suitably formed section of the radial seal will release a path for the fuel.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A fuel filter comprising:
   a coalescent element for separating water from fuel;
   a prefilter element of a filter medium;
   a main filter element; and
   a common central tube,
   wherein said coalescent element, said prefilter element, and said main filter element are arranged sequentially along said common central tube and on a radial exterior of said common central tube;
   wherein said common central tube comprises a plurality of elongated flow chambers extending in an axial direction of said common central tube and arranged within said common central tube;
   wherein at least two of said plurality of elongated flow chambers extend parallel to each other in different angular segments of said common central tube;
   wherein said coalescent element, said prefilter element, and said main filter element are flowed through radially between an exterior of said element and a respective one of said elongated chambers.

2. The fuel filter according to claim 1, further comprising a separating device extending radially outwards from said common central tube and sealably engaging a housing in which said common central tube is arranged and connected, said separating device separating an interior in said housing into an upper annular section and a lower annular section,
   wherein said separating device is arranged between said main filter element and said coalescent element or between said main filter element and said prefilter element.

3. The fuel filter according to claim 2, wherein said separating device is operable as a valve for bypassing fuel around said prefilter element to said main filter element when said prefilter element is clogged.

4. The fuel filter according to claim 3, wherein said valve is an elastic seal sealing the fuel filter relative to the housing.

5. The fuel filter according to claim 4, wherein said elastic seal is a sealing lip.

6. The fuel filter according to claim 1, wherein
said coalescent element is arranged between said main filter element and said prefilter element.

7. The fuel filter according to claim 1, wherein
said common central tube comprises at least three elongated chambers extending in axial direction of said common central tube.

8. The fuel filter according to claim 7, wherein
said at least three chambers each have at least one opening peripherally provided on a radial wall of said common central tube.

9. The fuel filter according to claim 7, wherein
a first chamber of said at least three chambers has a first opening peripherally arranged on said common central tube supplying unfiltered fuel to said coalescent element.

10. The fuel filter according to claim 7, wherein
one of said at least three chambers is a venting chamber extending in an axial direction of said common central tube, wherein said venting chamber has a venting opening provided at an upper end face of said common central tube.

11. The fuel filter according to claim 9, wherein
said first chamber is provided at an upper end of said coalescent element with a deflection surface closing off an upper portion of said first chamber deflecting fuel from said first chamber to said first opening.

12. The fuel filter according to claim 9, wherein
a second chamber of said at least three chambers has a second opening provided peripherally on said common central tube discharging filtered fuel from said prefilter element.

13. The fuel filter according to claim 12, wherein
said second opening is angularly displaced about an axis of said central tube relative to said first opening.

14. The fuel filter according to claim 12, wherein
a third chamber of said at least three chambers has a third opening provided peripherally on said common central tube removing filtered fuel from said main filter element.

15. The fuel filter according to claim 14, wherein
said third opening is angularly displaced about an axis of said central tube relative to said first and second openings.

16. The fuel filter according to claim 1, wherein
said common central tube is of a two-part configuration comprising a first part and a second part.

17. The fuel filter according to claim 16, wherein
said first and second parts are sealably connected to one another at an upper end of said coalescent element.

18. A fuel filter arrangement comprising:
a fuel filter comprising
a coalescent element separating water from fuel;
a prefilter element, a main filter element; and
a common central tube;
wherein said coalescent element, said prefilter element, and said main filter element are arranged sequentially along said common central tube and on a radial exterior of said common central tube;
wherein said common central tube comprises a plurality of elongated flow chambers extending in an axial direction of said common central tube and arranged within said common central tube;
wherein at least two of said plurality of elongated flow chambers extend parallel to each other in different angular segments of said common central tube;
wherein said coalescent element, said prefilter element, and said main filter element are flowed through radially between an exterior of said element and a respective one of said elongated chambers; and
a housing to which said common central tube is attached, wherein between said fuel filter and said housing an annular space is formed.

19. The fuel filter arrangement according to claim 18, further comprising:
a separation device that separates said annular space in an area between said coalescent element and said main filter element or in an area between said prefilter element and said coalescent element such that an upper annular section and a lower annular section are formed.

20. The fuel filter arrangement according to claim 19, wherein
said housing comprises a water collecting chamber at a lower end of said lower annular section.

* * * * *